(12) United States Patent
Graves et al.

(10) Patent No.: US 11,708,157 B2
(45) Date of Patent: Jul. 25, 2023

(54) VERTICAL TAKE-OFF AND LANDING (VTOL) AIRCRAFT WITH CRUISE ROTOR POSITIONING CONTROL FOR MINIMUM DRAG

(71) Applicant: EMBRAER S.A., São José dos Campos (BR)

(72) Inventors: Júlio Cesar Graves, São José dos Campos (BR); Yasser Mahmud Abdallah, São José dos Campos (BR); Leandro Guimarães Maia, São José dos Campos (BR); Carlos Eduardo Vieira De Souza, São José dos Campos (BR); Luiz Felipe Ribeiro Valentini, São José dos Campos (BR)

(73) Assignee: EVE UAM, LLC, Wilmington, DE (US)

( * ) Notice: Subject to any disclaimer, the term of this patent is extended or adjusted under 35 U.S.C. 154(b) by 42 days.

(21) Appl. No.: 16/564,350

(22) Filed: Sep. 9, 2019

(65) Prior Publication Data

US 2020/0079501 A1    Mar. 12, 2020

Related U.S. Application Data

(60) Provisional application No. 62/729,603, filed on Sep. 11, 2018.

(51) Int. Cl.
*B64C 27/57* (2006.01)
*B64C 5/02* (2006.01)
(Continued)

(52) U.S. Cl.
CPC ............... *B64C 27/57* (2013.01); *B64C 5/02* (2013.01); *B64C 9/00* (2013.01); *B64C 11/00* (2013.01);
(Continued)

(58) Field of Classification Search
CPC ......... B64C 27/26; B64C 27/30; B64C 27/57; B64C 27/68; B64C 5/02; B64C 11/00; B64C 29/0025
See application file for complete search history.

(56) References Cited

U.S. PATENT DOCUMENTS 9,120,560 B1    9/2015  Armer et al.
9,242,738 B2    1/2016  Kroo
(Continued)

FOREIGN PATENT DOCUMENTS

| EP | 2604519 A1 | 6/2013 | |
| WO | 2015157114 A1 | 10/2015 | |
| WO | WO-2018081802 A1 * | 5/2018 | ........... B64C 27/008 |

OTHER PUBLICATIONS

Extended European Search Report issued in European Application No. 19196695.1 dated Jan. 14, 2020 (8 pages).

*Primary Examiner* — Joshua J Michener
*Assistant Examiner* — Colin Zohoori
(74) *Attorney, Agent, or Firm* — Nixon & Vanderhye P.C.

(57) ABSTRACT

Vertical takeoff and landing (VTOL) aircraft are provided with fixed-position port and starboard wings extending laterally from an elongate fuselage having an empennage at an aft end of the fuselage and a propeller to provide horizontal thrust to the aircraft in a direction of the longitudinal axis thereof. A series of port and starboard rotor units are provided, each of which includes axially opposed rotor blades, and a motor to rotate the rotor blades and provide vertical thrust to the aircraft. A logic control unit (LCU) controllably sets an angular position of the opposed rotor blades along a position axis relative to the longitudinal axis of the aircraft in response to determining an optimal position of the rotor blades during cruise flight operation to thereby minimize airflow disruption over the fixed-position wings.

12 Claims, 7 Drawing Sheets

(51) Int. Cl.
  *B64C 11/00* (2006.01)
  *B64C 27/26* (2006.01)
  *B64C 27/30* (2006.01)
  *B64C 27/68* (2006.01)
  *B64C 29/00* (2006.01)
  *B64C 9/00* (2006.01)
  *B64D 35/02* (2006.01)

(52) U.S. Cl.
  CPC .............. *B64C 27/26* (2013.01); *B64C 27/30* (2013.01); *B64C 27/68* (2013.01); *B64C 29/0025* (2013.01); *B64D 35/02* (2013.01)

(56) References Cited

U.S. PATENT DOCUMENTS

| | | |
|---|---|---|
| 9,944,387 B2 | 4/2018 | Vander Lind et al. |
| 2013/0092799 A1* | 4/2013 | Tian ................... B64C 27/26 |
| | | 244/7 R |
| 2016/0207625 A1* | 7/2016 | Judas ................ B64C 29/0025 |
| 2017/0225779 A1 | 8/2017 | Gamble |
| 2018/0105279 A1* | 4/2018 | Tighe .................... B64D 29/02 |
| 2018/0118335 A1 | 5/2018 | Gamble et al. |
| 2019/0127056 A1* | 5/2019 | Weekes ................ B64C 27/08 |

\* cited by examiner

VERTICAL TAKE-OFF AND LANDING (VTOL) AIRCRAFT WITH CRUISE ROTOR POSITIONING CONTROL FOR MINIMUM DRAG

CROSS-REFERENCE TO RELATED APPLICATION

This application is based on and claims domestic priority benefits of U.S. Provisional Application Ser. No. 62/729,603 filed on Sep. 11, 2018, the entire contents of which are expressly incorporated hereinto by reference.

FIELD

The embodiments disclosed herein relate generally to aircraft capable of vertical take-off and landing (VTOL) operations. According to certain embodiments disclosed herein aircraft having VTOL capabilities are provided with rotors which provide vertical thrust forces to allow hovering during thrustborn flight while minimizing rotor airflow disturbance over the wing airfoils during wingborn flight.

BACKGROUND

The design of a wingborn aircraft requires efficiency in cruise. To achieve the best lift to drag ratio during major flight time, it is required that a very detailed design of all external surfaces be conducted. However, such aircraft do not have VTOL capabilities. Vertical flight poses an even greater challenge once longitudinal velocity is lower in takeoff and landing procedures. Moreover, the lift force provided by a wing (if any is present) is relatively small during vertical flight.

One classical solution for providing VTOL capability that is currently the most widely accepted technique is rotorcraft, such as helicopters, which provide a thrustborn solution. Modern VTOL aircraft designs are currently combining both wingborn and thrustborn capabilities mainly due to improvement with respect to electrical powertrain systems. Some electrical VTOL (e-VTOL) aircraft architectures allow distributed power management by using multiple electric rotors. The most common solution currently available for e-VTOL aircraft is a multi-copter which differs from a conventional helicopter as it includes multiple electric motors, instead of a combustion-engine driven single rotor, and alternatively wings, pushers, tilting or other mechanisms that provide thrust or lift forces.

Many e-VTOL multi-copter architectures and designs are possible. Due to the popularization of drone aircraft in recent years, a quad-copter configuration is the preferable craft by most individuals. However, original equipment manufacturers (OEMs) have developed several different combinations, i.e., hexa- and octa-copters. Despite the amount of rotors on any such e-VTOL aircraft, the positioning of the rotors is also important to assure safety level and performance.

A complex e-VTOL aircraft architecture for passenger transport leads to very restrictive safety requirements. Market trends indicate a considerable increase of multi-copter transportation net in the foreseeable future. To mitigate human failures in a widespread transport method, intelligent vehicles are likely to be developed that are capable of accomplishing the entire mission autonomously, safely, cheaply, efficiently and quietly.

If it is assumed that a particular configuration requires a set of rotors generating thrust during takeoff or landing, but the set of rotors is not required during cruise flight, then the presence of such rotors will generate drag in cruise flight degrading vehicle performance. In this scenario, at least two possible solutions are available, namely (1) keep the rotors rotating to partially generate thrust force and reduce the wing load, or (2) stop the rotation of all rotors (e.g., as proposed by U.S. Pat. No. 9,944,387 and US 2018/0118335, the entire contents of each being expressly incorporated hereinto by reference). The first solution is convenient if vehicle sizing requires rotors with more than two blades. The second solution is adequate for, but not limited to, rotors with two or less blades, but is also proper if the rotor blades are capable of folding during wingborne flight.

It would therefore be highly desirable if VTOL aircraft could be provided whereby the rotors required for thrust-borne flight could be adjusted so as to minimize (if not eliminate entirely) airflow disturbance over the wings of the aircraft during wingborne flight. It is towards fulfilling such a need that the embodiments disclosed herein are directed.

BRIEF DESCRIPTION

Broadly, the embodiments disclosed herein are directed toward vertical takeoff and landing (VTOL) aircraft having fixed-position port and starboard wings extending laterally from an elongate fuselage having an empennage at an aft end of the fuselage and a propeller to provide horizontal thrust to the aircraft in a direction of the longitudinal axis thereof. A series of port and starboard rotor units are provided, each of which includes axially opposed rotor blades, and a motor to rotate the rotor blades and provide vertical thrust to the aircraft. A logic control unit (LCU) controllably sets an angular position of the opposed rotor blades along a position axis relative to the longitudinal axis of the aircraft in response to determining an optimal position of the rotor blades during cruise flight operation to thereby minimize airflow disruption over the fixed-position wings.

According to certain embodiments, the VTOL aircraft may be provided with port and starboard rotor booms (which may be aligned parallel to the elongate axis of the fuselage) which are carried by the port and starboard wings and supporting the series of port and starboard rotor units, respectively. The port and starboard rotor booms may extend forwardly and aft of the port and starboard wings, respectively.

Each of the rotor units comprise a rotor position sensor (RPS) which senses the angular position of the rotor blades relative to the longitudinal axis of the fuselage and issues a position signal to the LCU. Each of the rotor units may also comprise a motor operatively connected to a motor control unit (MCU) such that the LCU can issue a control signal to the MCU which in turn issues a command signal to the motor to cause the rotor blades to assume the optimal position of the rotor blades during cruise flight operation.

The VTOL aircraft may comprise two pairs of port rotor units and two pairs of starboard rotor units. A first pair of each of the port and starboard rotor units may carried by the port and starboard rotor booms forwardly of the port and starboard wings and a second pair of each of the port and starboard rotor units may carried by the port and starboard rotor booms aft of the port and starboard wings, respectively.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION OF EMBODIMENTS

Figure 1:
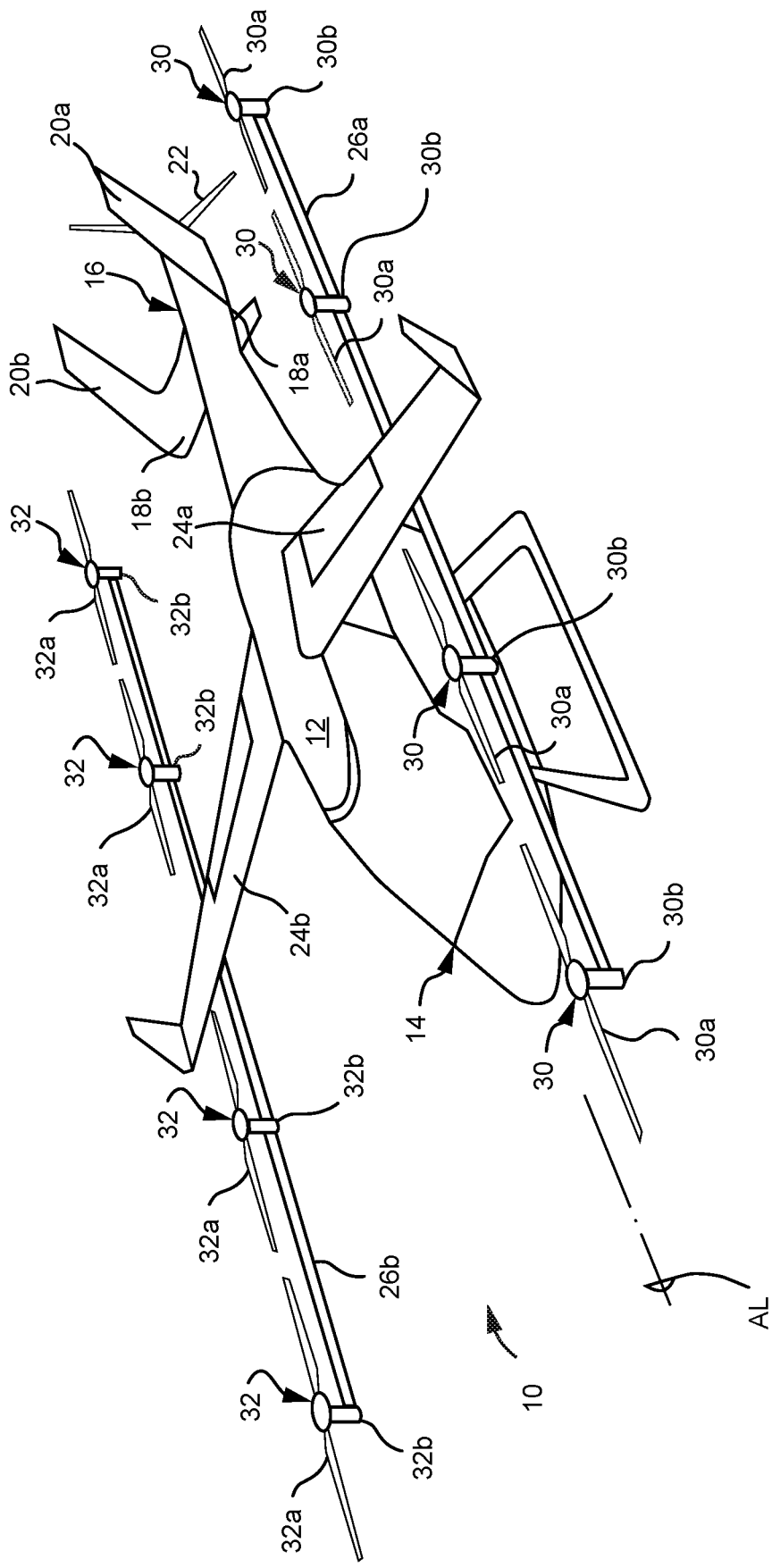
FIG. 1 is a non-limiting embodiment of a VTOL aircraft in accordance with this invention.

Accompanying FIG. 1 shows an exemplary VTOL aircraft 10 in accordance with an embodiment of this invention. The aircraft 10 includes an elongate fuselage 12 defining a central elongate axis $A_L$ having a forward passenger compartment 14 and an aft empennage 16, the latter being provided with port and starboard elevators 18a, 18b and rudders 20a, 20b, respectively. A tail-mounted propeller 22 powered by an on-board motor (e.g., an electric motor (not shown)) provides pusher thrust for the aircraft 10.

Port and starboard wings 24a, 24b extend laterally outwardly from the fuselage and carry port and starboard rotor booms 26a, 26b, respectively. In the embodiment depicted, each of the rotor booms 26a, 26b includes port-side rotor units 30 and starboard side rotor units 32, each having an axially opposed pair of rotor blades 30a, 32a (i.e., so-called two-blade rotors) and a dedicated motor 30b, 32b which provides the blades 30a, 30b with sufficient revolutions to allow for lift during takeoff and landing operations as well as to provide controllability to the aircraft 10.

Figure 2:
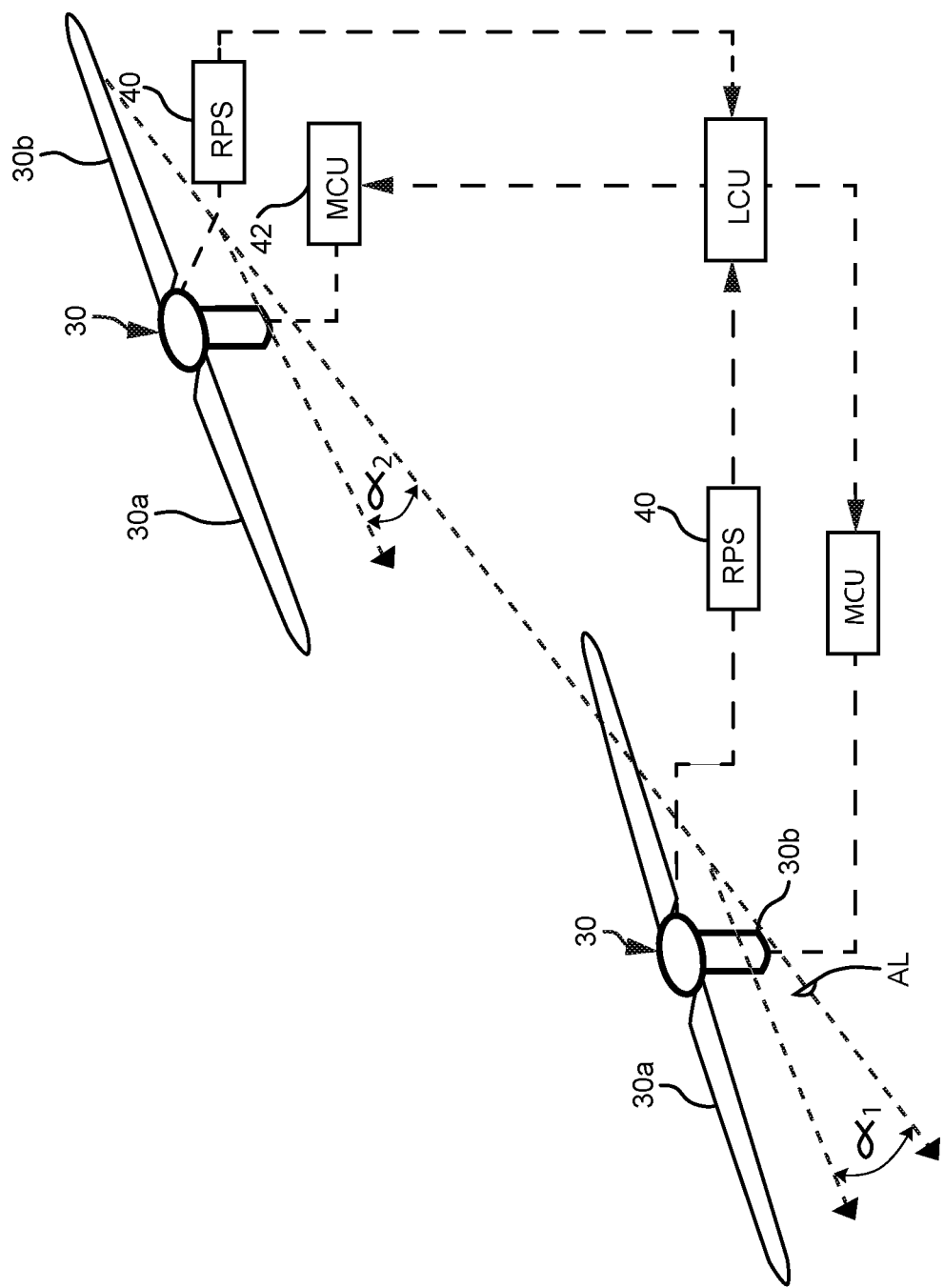
FIG. 2 is a schematic representation of a pair of rotors associated with the VTOL aircraft shown in FIG. 1 shown with the rotors locally aligned with airflow.

An exemplary pair of the port-side rotor units 30 are depicted in FIG. 2 and are representative of all other pairs of rotor units 30, 32. As such, reference to the other starboard-side rotor units 32 will be noted parenthetically in the following discussion in relation to the air of rotor units 30 depicted in FIG. 2. Each of the rotor units 30(32) is provided with a rotor position sensor (RPS) 40 which senses the axial positioning of the rotor blades 30a(32a) (i.e., along a position axis $A_P$). The RPS 40 will therefore issue a position signal to a logic control unit (LCU) 42. The LCU 42 will receive the position signal from the RPS 40 and issue a control signal to a motor control unit (MCU) 44 which in turn issues a command signal to the individual motors 30b(32b) to position the rotor blades 30a(32a) along a position axis $A_P$ to form angles α1 and α2 (which may be the same or different) based on the optimal position of the rotor blades 30a(32a) in dependence upon the aircraft's flight phase. The rotor blades 30a(32a) will therefore be actively aligned along individual axes $A_P$ relative to local airflow during cruise flight based on the LCU 42 determination of optimal positioning so as to provide minimal airflow disturbance over the wings 24a, 24b.

The LCU 42 may therefore either actively align each of the rotor blades 30a(32a) along axes $A_P$ either in response to measurement of the local airflow (e.g., by suitable on-board instrumentation), or in response to the aircraft's altitude (i.e., by setting a new optimal rotor position for each of the aircraft's alpha and/or beta angle. The latter is easier to accomplish as compared to the former because alpha and beta angles are available for flight control purposes. The former requires local airflow measure. The optimal rotor position can thus be estimated offline (when set in consideration of aircraft altitude) or online (when set using local airflow measurement). With regard to optimal rotor positioning based on aircraft altitude, a table can simply be stored in the LCU 42 using linear interpolations over alpha and/or beta values.

According to the embodiment depicted, the RPS 40 will determine the axial positioning along axis $A_P$ relative to the longitudinal axis $A_L$ of the aircraft 10 as previously mentioned. The LCU 42 may therefore include control logic having a dedicate resolution algorithm for rotor blades 30a(32a) for each of the rotor units 30(32). To command the rotor blades 30a(32a) to the desired position, the control logic of the LCU 42 will modulate the stator's magnetic field to minimize the error between measured rotor position and optimal position determined by the resolution algorithm.

Figure 3A:
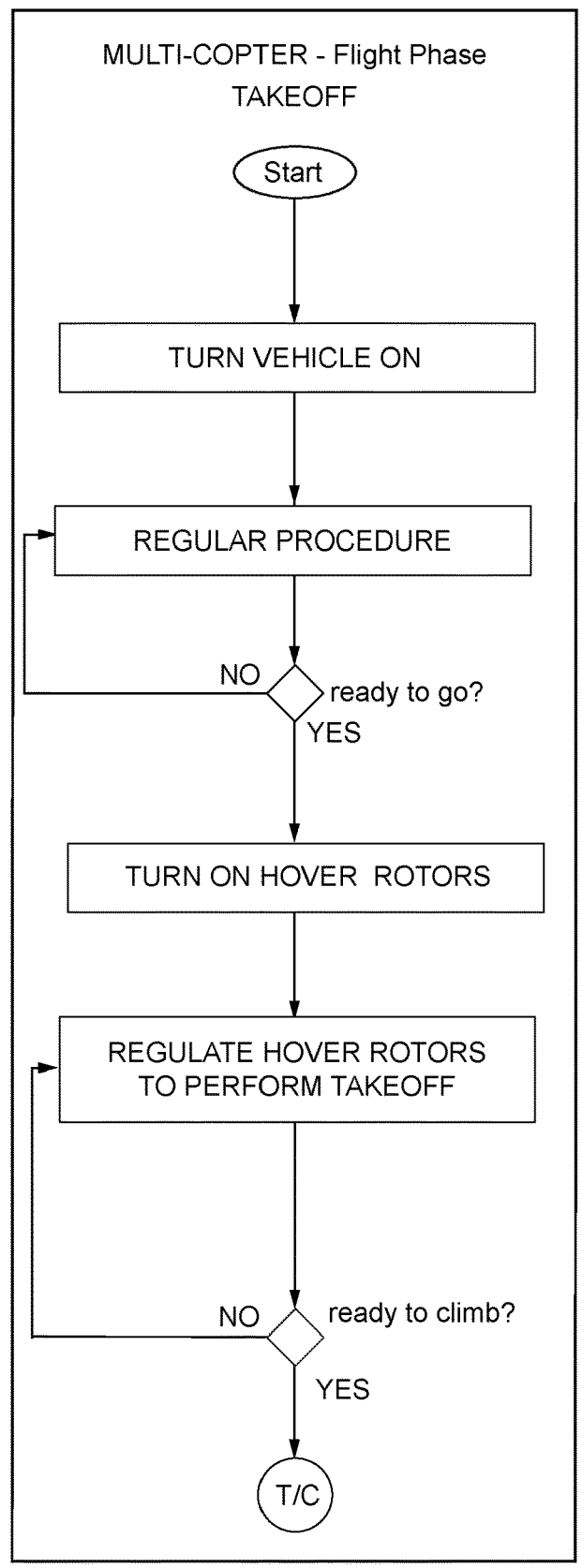
FIGS. 3A-3E are operational control logic diagrams that may be employed for the VTOL aircraft shown in FIG. 1 during various flight phases.
Figure 3B:
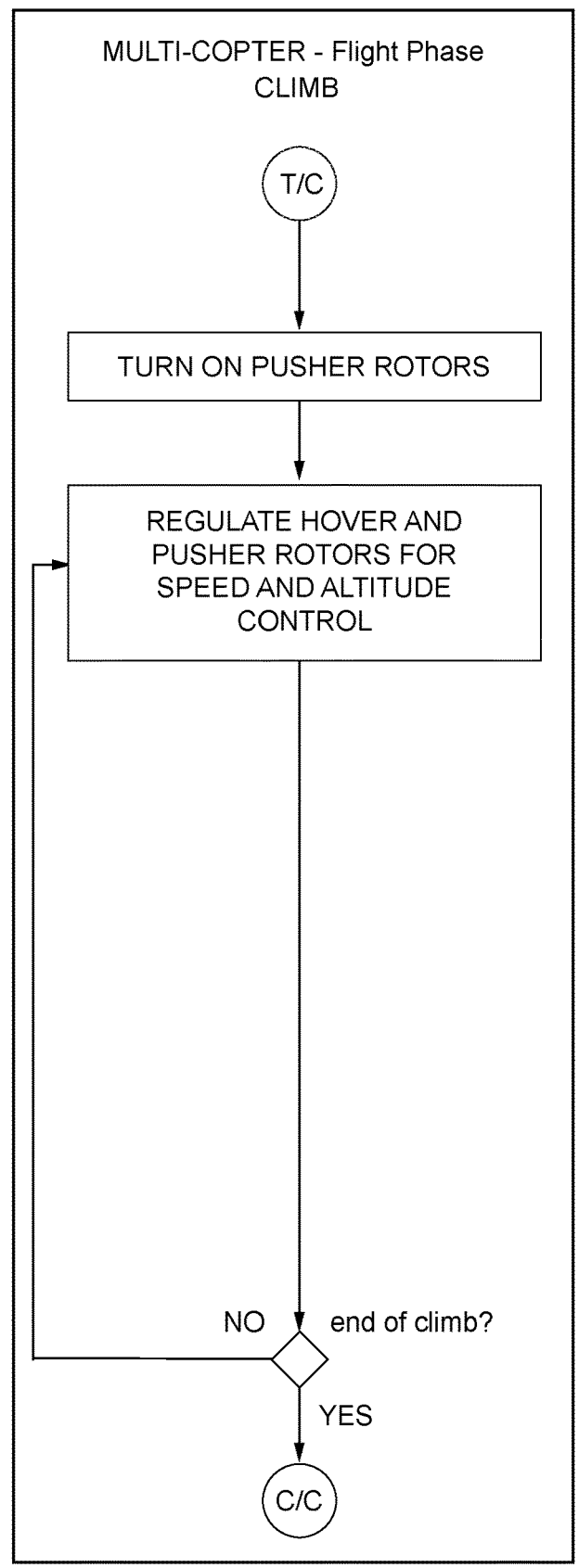
Figure 3C:
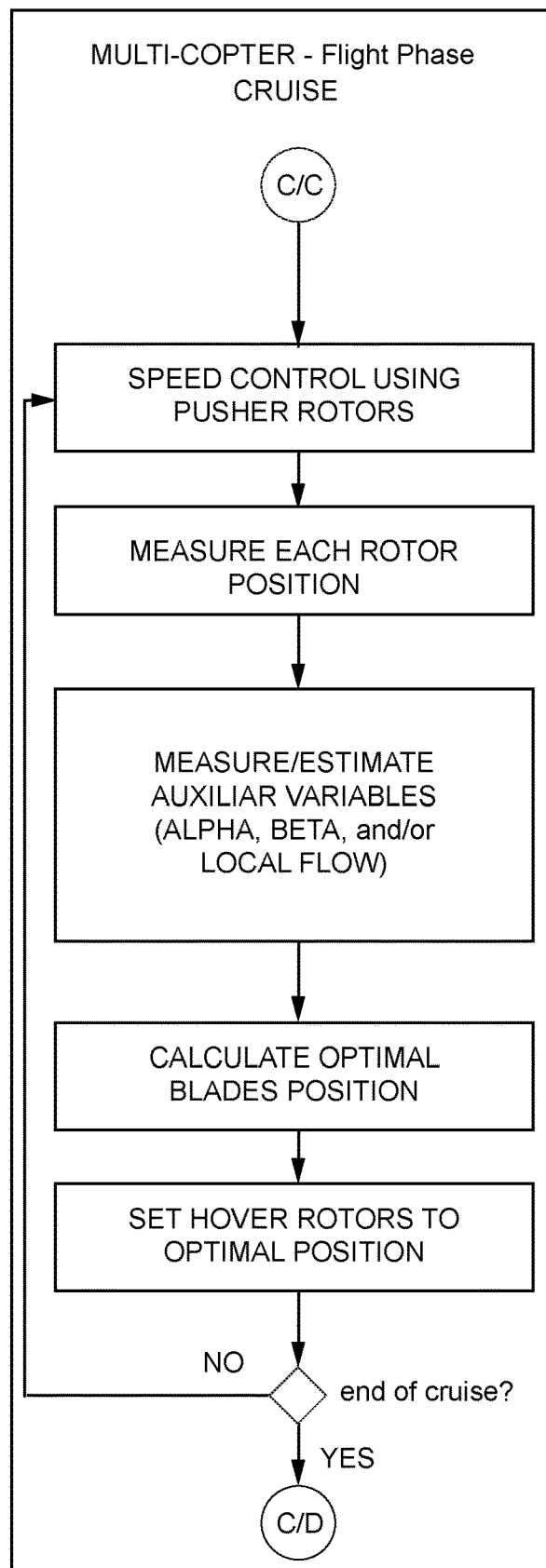
Figure 3D:
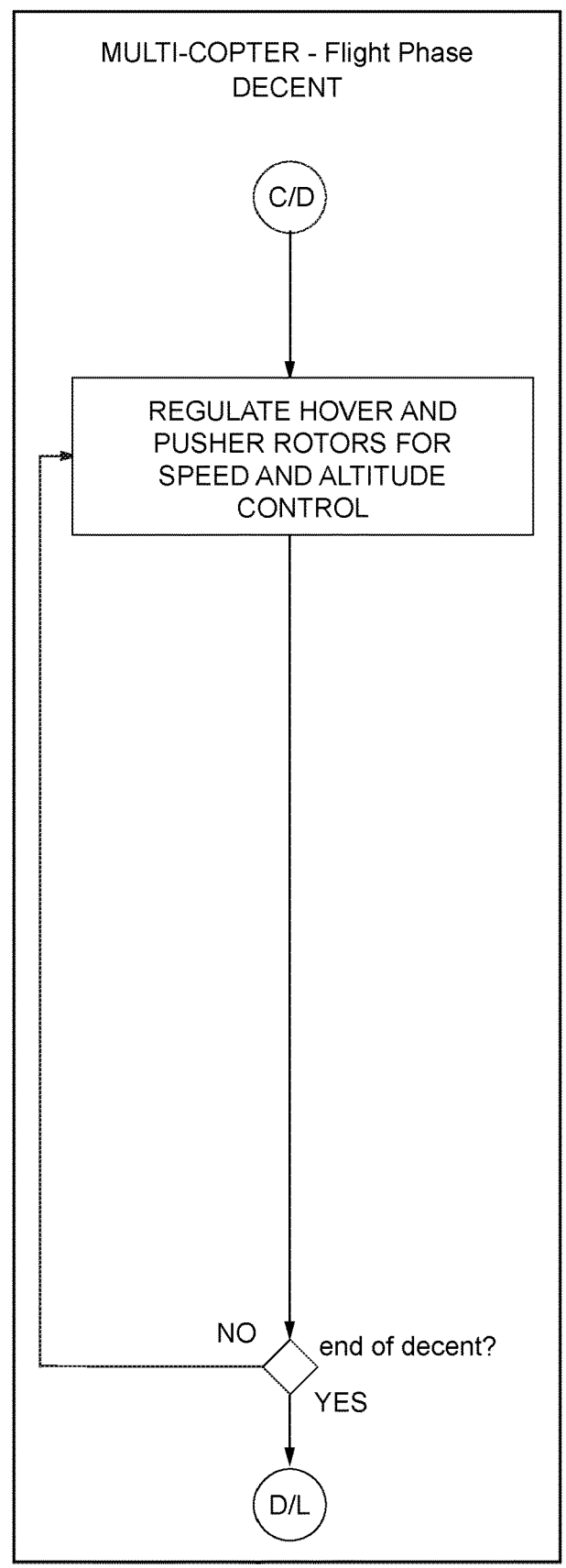
Figure 3E:
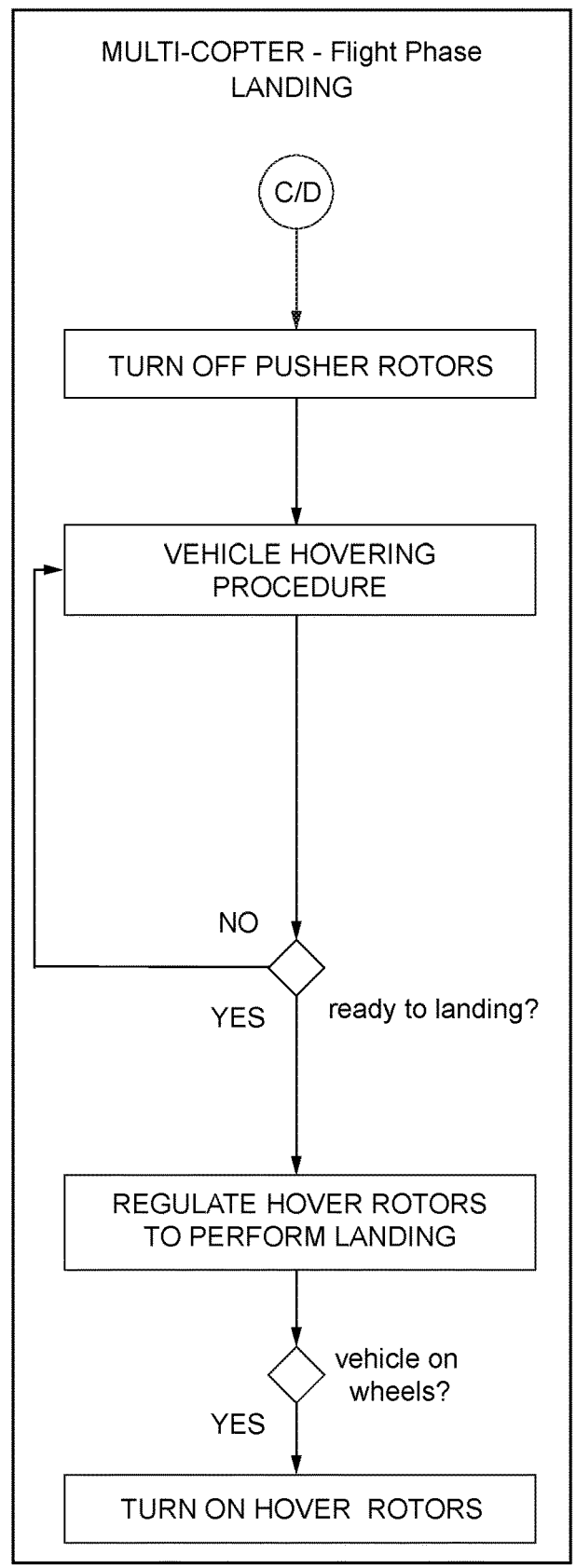

Typical operational phases of the multi-copter aircraft 10 include takeoff, climb, cruise, descent and landing. The control logic processes for the aircraft 10 for each such phase are depicted in FIGS. 3A-3E, respectively. During takeoff phase (FIG. 3A), after all regular procedures, the motors 30b, 32b start so as to rotate the rotor blades 30a, 32a and generate sufficient lift to assure a required altitude climb rate. In climb (FIG. 3B), the pusher propeller 22 can be engaged and the combination of hover and pusher rotor thrust s allows the aircraft 10 to gain speed and altitude at a controlled rate. At the end of the climb phase, the wings 24a, 24b will generate all lift and hover rotor units 30, 32 are unloaded, at which time the cruise phase begins (FIG. 3C). Using all measured positions and local airflow of the hover rotor units 30, 32 and/or the attitude of the aircraft 10, the LCU 40 via the MCU 44 will command all hover rotor blades 30a, 32a to the optimal position during cruise phase flight. In descent (FIG. 3D), the aircraft's control can employ the hover rotor blades 30a, 32a to control altitude descent rate and the pusher propeller 22 to reduce forward speed. At the end of descent phase, the wings 24a, 24b are aerodynamically unloaded and the hover rotor blades 30a, 32 are fully aerodynamically loaded. During landing (FIG. 3E), the control law uses hover rotor blades 30a, 32a to precisely land the aircraft at which time the rotor units 30, 32 may be turned off.

Therefore, while reference is made to a particular embodiment of the invention, various modifications within the skill of those in the art may be envisioned. Therefore, it is to be understood that the invention is not to be limited to the disclosed embodiment, but on the contrary, is intended to cover various modifications and equivalent arrangements included within the spirit and scope thereof.

What is claimed is:

1. A vertical takeoff and landing (VTOL) aircraft comprising:
   an elongate fuselage defining a longitudinal axis of the aircraft;
   fixed-position port and starboard wings extending laterally from the fuselage;
   an empennage at an aft end of the fuselage;
   a propeller to provide horizontal thrust to the aircraft in a direction of the longitudinal axis thereof;
   a series of port and starboard rotor units each of which includes axially opposed rotor blades, a motor to rotate the rotor blades and provide vertical thrust to the aircraft, and at least one rotor position sensor that senses angular position of the axially opposed rotor blades; and
   a logic controller operatively coupled to the sensors and to the port and starboard rotor unit motors, the logic controller configured to dynamically allocate positions of the rotor blades of each rotor unit during cruise flight operation based on a current flight state of the vehicle by controllably individually actively aligning the angular positions of the axially opposed rotor blades of each rotor unit along position axes relative to local airflow over the aircraft in response to sensed positions of the axially opposed rotor blades of the rotor unit, to minimize airflow disruption over the fixed-position wings during cruise flight operation.

2. The VTOL aircraft according to claim 1, further comprising port and starboard rotor booms carried by the port and starboard wings and supporting the series of port and starboard rotor units, respectively.

3. The VTOL aircraft according to claim 2, wherein the port and starboard rotor booms are aligned parallel to the longitudinal axis of the fuselage.

4. The VTOL aircraft according to claim 3, wherein the port and starboard rotor booms extend forwardly and aft of the port and starboard wings, respectively.

5. The VTOL aircraft according to claim 4, wherein at least a first one of the port and starboard rotor units is carried by the port and starboard rotor booms forwardly of the port and starboard wings and a second one of the port and starboard rotor units is carried by the port and starboard rotor booms aft of the port and starboard wings, respectively.

6. The VTOL aircraft according to claim 4, wherein a first pair of the port and starboard rotor units is carried by the port and starboard rotor booms forwardly of the port and starboard wings and a second pair of the port and starboard rotor units is carried by the port and starboard rotor booms aft of the port and starboard wings, respectively.

7. The VTOL aircraft according to claim 1, wherein each of the rotor units comprising a said rotor position sensor (RPS) which senses the angular position of the rotor blades of said rotor unit relative to the longitudinal axis of the fuselage and issues a position signal to the logic controller, the logic controller using the position signal to actively align the rotor blades in response to:
  measurement of local airflow at the rotor unit, or
  altitude of the aircraft based on linear interpolations over alpha and/or beta values of the aircraft.

8. The VTOL aircraft according to claim 7, wherein each of the rotor units comprises a motor and a motor controller operatively connected to the motor, wherein the logic controller issues a control signal to the motor controller which in turn issues a command signal to the motor to control the rotor blades to assume individual positions based on optimal position of the rotor blades in dependence upon the aircraft's flight phase, that minimize airflow disruption over the fixed-position wings during cruise flight operation.

9. The VTOL aircraft according to claim 1, wherein the propeller is a pusher propeller located at an aft end of the fuselage.

10. The VTOL aircraft according to claim 1, wherein the aircraft comprises two pairs of the port rotor units and two pairs of the starboard rotor units.

11. The VTOL aircraft according to claim 10, wherein a first pair of each of the port and starboard rotor units is carried by the port and starboard rotor booms forwardly of the port and starboard wings and a second pair of each of the port and starboard rotor units is carried by the port and starboard rotor booms aft of the port and starboard wings, respectively.

12. The VTOL aircraft according to claim 11, wherein the port and starboard rotor booms extend forwardly and aft of the port and starboard wings, respectively.

\* \* \* \* \*